(12) United States Patent
Ekman et al.

(10) Patent No.: US 7,014,898 B2
(45) Date of Patent: Mar. 21, 2006

(54) OXYGEN SCAVENGING

(75) Inventors: Kenneth Ekman, Piispanristi (FI); Barry Anthony Murrer, Berkshire (GB); Robert Peltonen, Kaarina (FI); Mats Sundell, Littoinen (FI)

(73) Assignees: Johnson Matthey Public Limited Company, London (GB); Oy Smoptech Ab, Turku (FI)

( * ) Notice: Subject to any disclaimer, the term of this patent is extended or adjusted under 35 U.S.C. 154(b) by 0 days.

(21) Appl. No.: 10/343,597

(22) PCT Filed: Aug. 2, 2001

(86) PCT No.: PCT/GB01/03483

§ 371 (c)(1),
(2), (4) Date: Aug. 27, 2003

(87) PCT Pub. No.: WO02/11566

PCT Pub. Date: Feb. 14, 2002

(65) Prior Publication Data

US 2004/0048011 A1 Mar. 11, 2004

(30) Foreign Application Priority Data

Aug. 3, 2000 (GB) .................... 0018935

(51) Int. Cl.
B29D 22/00 (2006.01)
B29D 23/00 (2006.01)
B32B 1/08 (2006.01)

(52) U.S. Cl. .............. 428/35.7; 252/188.28; 525/370; 422/4; 428/292.1

(58) Field of Classification Search .............. 428/35.7, 428/36.6, 36.7, 292.1; 252/188.28; 525/370; 422/4

See application file for complete search history.

(56) References Cited

U.S. PATENT DOCUMENTS

| 5,326,825 A | 7/1994 | Näsman et al. |
| 5,415,908 A * | 5/1995 | Nasman et al. ............ 428/36.2 |
| 6,323,288 B1 * | 11/2001 | Ching et al. ................ 525/370 |

FOREIGN PATENT DOCUMENTS

| EP | 0 629 441 | 12/1994 |
| EP | 0666977 B1 * | 5/1998 |
| GB | 1065992 | 4/1967 |
| JP | 07062107 A * | 3/1995 |
| WO | WO 96/07711 | 3/1996 |
| WO | WO 99/05922 | 2/1999 |
| WO | WO 02/36648 | 5/2002 |

OTHER PUBLICATIONS

English Abstract of Japanese Patent No. 55043428 (published Mar. 27, 1980).
International Search Report dated Feb. 27, 2002, from International Application No. PCT/GB01/03483.
British Search Report dated Dec. 22, 2000, from UK Application No. 0018935.7.

* cited by examiner

*Primary Examiner*—Michael C. Miggins
(74) *Attorney, Agent, or Firm*—RatnerPrestia

(57) ABSTRACT

A fibrous catalyst comprises at least one transition metal anchored to a polymer fiber having a plurality of grafted units grafted to a polymer backbone. The polymer backbone may be a polyolefin, a fluorinated polyethylene, cellulose or viscose. The grafted units comprise a salt of a carboxylic acid, which in a preferred embodiment is a sodium salt of acrylic acid. The catalysts are particularly suitable for scavenging oxygen from sealed packages or containers and may further comprise a chemical indicator for the presence or absence of oxygen.

15 Claims, 2 Drawing Sheets

OXYGEN SCAVENGING

Figure 1:
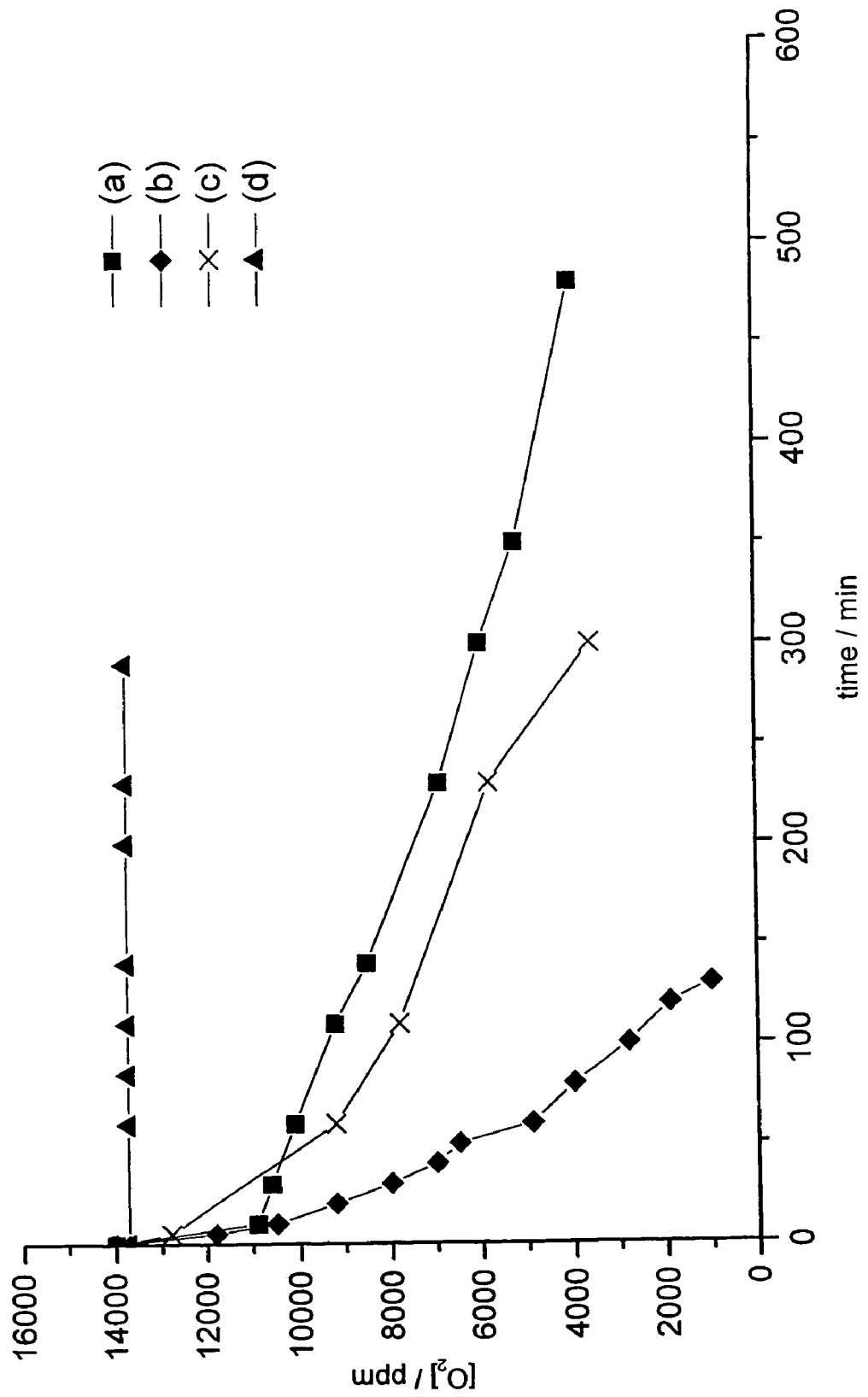

This application is the U.S. national phase of PCT International Application No. PCT/GB01/03483.

This invention relates to products for removing oxygen from enclosed spaces. More particularly this invention relates to the use of fibrous catalysts for the catalytic removal of oxygen, and for the visual indication of the presence or non-presence of oxygen.

The presence of oxygen in food packages causes rapid spoilage of the food, typically by causing oxidation of fats and vitamins, or by increasing the growth of aerobic bacteria, yeast and moulds requiring the presence of oxygen.

At present, the preservation of food is generally improved by packaging foods in a modified atmosphere in order to reduce oxygen levels. Typically packagers uses nitrogen or carbon dioxide. However, even the best technology available leaves 0.3–3% residual oxygen in the packages. At least some of the oxygen may be exuded from the contents of the package. It has been demonstrated that if the residual oxygen can be lowered to 0.1 to 0.2% the pigmentation of food can be markedly improved and microbial growth significantly reduced. This will reduce the rate of food spoilage and increase the shelf life of the products. Other associated benefits include reduced requirements for deliveries leading to energy and cost savings.

It has been known for some time that it is possible to remove oxygen from packages by using oxygen scavengers. These bind chemically with any oxygen present in the packages. Most widely used are scavengers based on iron dust, sulphites or ascorbic acid, which are usually placed in the package in separate gas permeable bags. Other scavengers have been developed for example, materials utilising the enzyme catalysed reaction of glucose and oxygen, or the copper-catalysed oxidation of ascorbic acid.

In the mid-1970's several companies developed techniques to incorporate oxygen scavengers based on palladium directly into packaging materials intended to convert oxygen permeating through the packaging into water. Several others attempts have been made to develop oxygen scavengers based on palladium and other platinum group metals (PGM).

Platinum Group Metals (PGM) can be used in packages for scavenging residual oxygen. The metals act by catalysing the reaction between oxygen and hydrogen to form water:

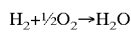
$H_2 + \frac{1}{2}O_2 \rightarrow H_2O$

Thus, the technique requires the addition of a small amount of hydrogen to the modified atmosphere in order to work. WO99/05922 describes some earlier attempts to use PGM for oxygen scavenging.

In GB 1,065,992, PGM are physically attached to a support such as polyethylene sheet or a fabric using an adhesive type material.

In accordance with a first aspect of the present invention, a fibrous catalyst comprises at least one transition metal anchored to a polymer fibre; wherein the polymer fibre comprises a plurality of grafted units grafted to a polymer backbone; and wherein the grafted units comprise a salt of a carboxylic acid.

In accordance with a second aspect of the present invention, a method of scavenging residual oxygen from a sealed package or container comprises flushing of the package or container with an inert gas containing hydrogen; and providing a fibrous catalyst such that the hydrogen reacts with the residual oxygen; characterised in that the catalyst comprises at least one transition metal anchored to a polymer fibre; wherein the polymer fibre comprises a plurality of grafted units grafted to a polymer backbone; and wherein the grafted units comprise a salt of a carboxylic acid.

In the context of the present invention, it should be understood that "inert gas" means a gas which is unreactive with respect to the contents of the package or container, rather than a gas which is unreactive under all circumstances; this may be, for example, nitrogen, helium, argon, carbon dioxide or a mixture of such gases.

Preferably, the polymer backbone is chosen from the group; polyolefins, fluorinated polyethylene, cellulose and viscose. Fibrous catalysts based on cellulose and viscose polymer backbones have been found to be particularly effective.

Suitable polyolefins are those formed from units of α-olefins, the units having the formula —$CH_2$—CHR—, where R is H or $(CH_2)_n CH_3$ and n is in the range of 0 to 20. Particularly suitable polyolefins are those which are homo- or co-polymers of ethylene and propylene. In the case of fluorinated polyethylenes, those formed from units of the general formula —$CF_2$—$CX_2$—, where X is H or F are suitable. For example, polyvinylidene fluoride and polytetrafluoroethylene are particularly preferred.

The formation of a salt of the carboxylic acid grafted units may be achieved by any suitable method however, preferably, the grafted units comprise an alkali metal salt of a carboxylic acid. This can be achieved simply by treating the catalyst with an alkali metal salt solution such as hydroxide. It is particularly favoured that the grafted units comprise a sodium salt of a carboxylic acid, by treating the catalyst with for example, sodium hydroxide solution. Other inorganic salts of carboxylic acids may also be used, some non-limiting examples including, salts of other metals such as alkaline earth metals, and metals such as iron. Organic salts of carboxylic acids may also be effective, some non-limiting examples including, ammonium or tetra-alkyl ammonium salts, and salts incorporating cationic polymer groups.

Suitable carboxylic acids include those chosen from the group; acrylic acid, methacrylic acid, vinyl benzoic acid and corresponding polyacids however, it will be appreciated that other carboxylic acids may also be used.

Preferably, the at least one transition metal is chosen from palladium, platinum and ruthenium, with palladium being particularly preferred. The transition metal may be anchored to the fibrous catalyst by immersing the polymer fibres in a solution of the metal. Any solution of a soluble metal salt may be used, for example a solution of a chloride or nitrate. In some circumstances it may be desirable to anchor two or more different transition metals to the polymer fibres. This may be achieved by immersing the fibres in a solution containing two or more soluble metal salts, or by following immersion in a solution of one salt by immersion in a further solution of a second salt. Once anchored to the polymer fibres, the transition metals can be reduced to their catalytically active form by treatment with a reducing agent. Suitable reducing agents include formaldehyde, sodium borohydride and hydrogen.

During research work on fibrous catalysts it was surprisingly found that a modification of the fibrous catalysts prepared according to U.S. Pat. Nos. 5,326,825, 5,415,908 and WO 02/36648 A1, performed particularly well as oxygen scavengers for the removal of oxygen from enclosed spaces. Fibrous catalysts according to the present invention can be prepared by anchoring transition metals onto graft modified polymers. In particular, fibrous catalysts prepared by anchoring palladium onto acrylic acid-grafted polyolefins, cellulose and viscose are active oxygen scavengers if the catalysts are treated with a solution of sodium hydroxide, converting the acid to its sodium salt.

Graft copolymers can be prepared in various ways but radiation grafting is an especially suitable method for graft modification of fibres. Radiation grafting is generally known, and involves steps of taking a polymer in a suitable form, for example, film, fibre, pellets, hollow fibre, membrane or non-woven fabric, and exposing the material to radiation, thus introducing reactive sites (free radicals) into the polymer chain. These free radicals can either combine to give cross-links, as is the case for polyethylene, or cause chain scission as is the case for polypropylene. On the other hand, the free radicals can be utilised to initiate graft copolymerisation under specific conditions. Three different methods of radiation grafting have been developed; 1) direct radiation grafting of a vinyl monomer onto a polymer (mutual grafting); 2) grafting on radiation-peroxidized polymers (peroxide grafting); and 3) grafting initiated by trapped radicals (pre-irradiation grafting). Pre-irradiation grafting is mostly preferred since this method produces only small amounts of homopolymer in comparison to mutual grafting and, as demonstrated in GB Patent Application No. 0026756.7, a high conversion of the grafted monomers can be achieved under specific process conditions. Various vinyl monomers can be grafted or co-grafted onto polymers including acrylic acid, methacrylic acid, acrylates, methacrylates, styrenes such as α-methyl styrene, vinyl benzyl derivatives such as vinyl benzyl chloride, vinyl benzyl boronic acid and vinyl benzyl aldehyde, vinyl acetate, vinyl pyridine, and vinyl sulphonic acid.

Although graft modified polymers based on polyolefins such as polyethylene are known, graft modifications to other polymer types are not. Accordingly, and in a further aspect of the present invention, a graft modified polymer comprises a plurality of grafted units grafted to a polymer backbone; wherein the polymer backbone comprises cellulose or viscose; and wherein the grafted units comprise vinyl monomer units.

Suitable vinyl monomer units include carboxylic acid units and salts of carboxylic acid units, although many other vinyl monomer units may also be used including acrylates, methacrylates, styrenes such as α-methyl styrene, vinyl benzyl derivatives such as vinyl benzyl chloride, vinyl benzyl boronic acid and vinyl benzyl aldehyde, vinyl acetate, vinyl pyridine, and vinyl sulphonic acid.

Graft modified polymers based on cellulose and viscose are more hydrophilic than corresponding polymers based on polyolefins. This may be advantageous for certain applications.

The graft copolymers or chemically modified graft copolymers can further be loaded with a combination of different metals forming catalytically active materials. The performance of the catalysts can be tailored by changing the metal content, chemical functionality and the ratio of different metals.

The metal loaded on the fibres can be reduced to its catalytic active form by various substances like formaldehyde, sodium borohydride, hydrogen etc.

Although the fibrous catalysts are suitable for use without further processing, it is preferred that a plurality of fibres are formed into a thread, a rope, a tow or a woven or non-woven fabric. Further processing can be done by a variety of different methods as are known in the art, including wet laid techniques, air laid techniques, filtering, carding and needle punching.

In a preferred embodiment of the present invention, a fibrous catalyst is incorporated into or attached to a package or container. In an alternative preferred embodiment, a fibrous catalyst is in the form of a label for inclusion in a package or container.

Preferably, the package or container, or label further comprises a chemical indicator. The type and function of the chemical indicator can be chosen to suit a particular purpose. However, as the fibrous catalysts of the present invention are particularly suitable for catalysing the reaction between hydrogen and oxygen preferably, the chemical indicator is an indicator for the presence or absence of oxygen. A particularly preferred chemical indicator is methylene blue.

The chemical indicator may be separate from the fibrous catalyst but is preferably carried on the fibrous catalyst.

Whilst a major use of the present invention is in oxygen scavenging from food containers and packaging, there are many other potential uses. For example, the invention may be used in security packaging of high value materials, including pharmaceuticals, precious metals in dust, grain or ingot form, other high value chemicals, computer components such as microprocessors, police evidence in drug trafficking or other criminal activities, securities such as bearer bonds, banknotes etc. Such packages could be made more secure by using the present invention to scavenge oxygen from the packages and using an indicator to indicate if the integrity of a package has been compromised. Oxygen from air entering an accidentally or deliberately damaged package could cause a readily detectable change in the indicator. For example, a visible colour change from white to blue would be seen if oxygen were admitted to a sealed package incorporating a methylene blue indicator.

The modified fibres, either in the form of fibrous catalysts or as graft copolymers, are particularly suitable to be converted into indicator fibres, by binding a chemical indicator thereto. We do not believe that this concept has previously been suggested, and such indicator fibres therefore form a further aspect of the present invention. Accordingly, an indicator fibre comprises a chemical indicator bound to a polymer fibre; wherein the polymer fibre comprises a plurality of grafted units grafted to a polymer backbone.

The indicator fibres may be prepared using chemical synthesis methods generally known in the art, for example by mixing reactive forms of the fibrous catalyst or graft copolymers with a reactive form of a chemical indicator, or by simple absorption or adsorption. It is particularly of interest for the other aspects of this invention that an indicator shows the presence or absence of oxygen; a preferred indicator is methylene blue. An indicator fibre can be prepared by preparing a Pd-catalysed acrylic-modified polyethylene and treating it with an aqueous solution of methylene blue. The skilled person can readily devise other forms of indicator fibre. It is envisaged that the indicator chosen may either cause a change in the visible spectrum (colour change or either revealing or hiding a message) or a change in the non-visible spectrum (UV-induced fluorescence, for example). The latter may be more acceptable for certain retailing or security interests, where it may not always be desirable for the change of the indicator to be visible to a person tampering with the package.

The indicator fibres can be spun, woven, carded, needle-punched, felted or otherwise converted into threads, ropes, tows, or woven or non-woven fabrics of any desired form. Thus this aspect of the present invention provides in one embodiment an indicator fabric which may be applied to a package, for example visibly to a transparent film portion of a package, or combined with a portion of fabric which is catalysed and the combination is used as an internal portion or label for a package. Furthermore, the indicator fibres may be spun or woven with catalysed fibres into combination threads or fabrics or combination non-woven fabrics, ropes, cords or tows may be prepared.

The present invention may be applied in a wide variety of ways by the skilled person.

Figure 2:
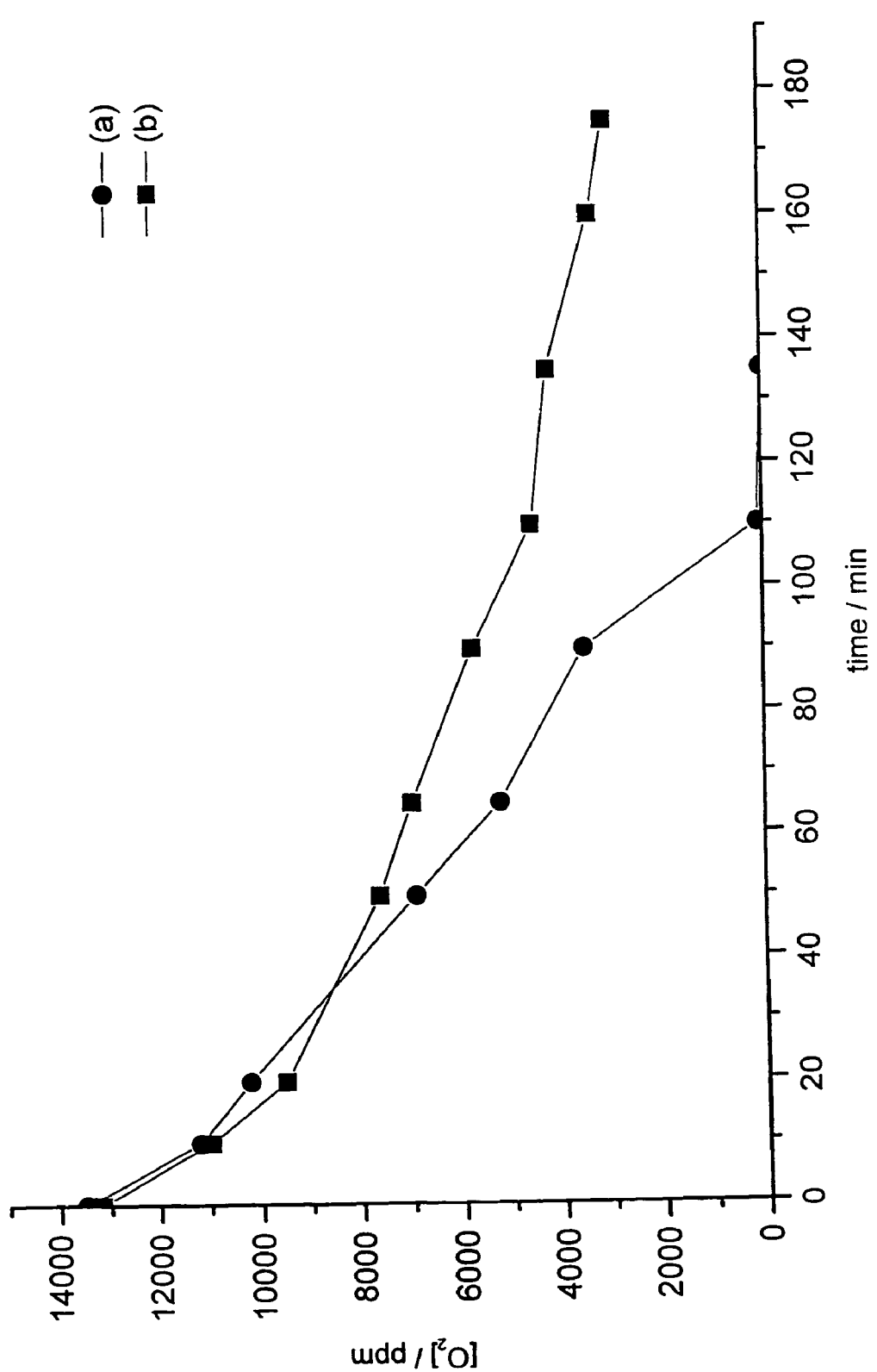

The invention will now be described by way of example only with reference to the following drawings in which;

FIG. 1 shows a graph of oxygen level measured in parts per million (ppm) against time in minutes, for three examples of Pd containing neutralised acrylic acid grafted polyethylene fibrous catalysts according to the present invention, and for comparison, one Pd containing acrylic acid grafted polyethylene fibrous catalyst in which the acid units have not been converted to a salt; and, FIG. 2 shows a graph of oxygen level measured in parts per million (ppm) against time in minutes, for one example of a Pd containing acrylic acid grafted viscose fibrous catalyst and one example of a Pd containing acrylic acid grafted cellulose fibrous catalyst according to the present invention.

EXAMPLE 1

Simple graft modified polyethylene fibres were produced as follows:

polyethylene fibres (0.7 Dtex) were irradiated under a nitrogen atmosphere using an Electrocurtan electron accelerator to a total dose of 150 kGy. The irradiated fibres were immediately immersed in an aqueous acrylic acid solution, which had been purged with nitrogen in advance for at least 30 minutes. The reaction was allowed to continue to completion, whereafter the fibres were washed repeatedly with water.

EXAMPLE 2

A fibrous catalyst containing 5 wt-% palladium was prepared as follows: 10 g of grafted fibres prepared as in example 1 were dispersed in water under stirring. 0.5 g of Pd was dissolved in $HNO_3$ and added to the stirred dispersion. The stirring was continued for an additional 0.5 hours. The pH was adjusted to 7 using sodium hydroxide solution and finally the catalysts were reduced using formaldehyde. The fibres and distilled water were stirred in a beaker and the pH of the solution was adjusted to 1.5 by a 1M $HNO_3$ solution. The fibres were filtered off the solution and stored for further use. The dry content was measured as 30 wt-%.

EXAMPLE 3

A fibrous catalyst according to the present invention was prepared as follows; 5 g of fibrous catalysts prepared according to example 2 and distilled water were stirred in a beaker. 1M sodium hydroxide solution was added under stirring to the beaker until the pH reached 11.5, thereby converting the acrylic acid grafts to the sodium salt. The fibrous catalysts were filtered off the solution and stored for further use.

EXAMPLE 4

Fibrous catalysts prepared according to example 2 were processed further to form a non-woven cloth using wet laid techniques, to yield a surface weight of the wet cloth of approximately 0.04 $g/cm^2$.

EXAMPLE 5

Fibrous catalysts prepared according to example 3 were processed further to form a non-woven cloth using wet laid techniques, to yield a surface weight of the wet cloth of approximately 0.04 $g/cm^2$.

EXAMPLE 6

The following test regime was used to evaluate the performance of the fibrous catalysts. Pieces weighing 109 mg (dry weight 12 mg) of non-woven cloth prepared according to examples 4 & 5 were cut and placed in a 150 ml steel cylinder, equipped with a valve and a GC septum. Using a vacuum pump and compressed $CO_2$ the cylinder was repeatedly evacuated and filled with $CO_2$ until the oxygen level in the cylinder reached a steady value. The oxygen content was measured by withdrawing small aliquots of the gas in the cylinder and injecting in a GC equipped with a Perkin Elmer Molecular Sieves 13X column.

1.8 ml $O_2$ and 6.3 ml $H_2$ were injected into the cylinder, and the oxygen content in the cylinder was followed by GC analysis as a function of time.

EXAMPLE 7

FIG. 1 shows the relative performances of a fibrous catalyst prepared as in examples 4 & 5. The rate reduction of the oxygen concentration in the steel cylinder using the catalyst of example 5, curve (b) in FIG. 1, showed a marked increase over that of example 4, curve (a) in FIG. 1. This demonstrates the increased effectiveness of the catalyst when the grafted acrylic acid units are converted to form the sodium salt using sodium hydroxide.

EXAMPLE 8

Two samples of non-woven cloths prepared according to Example 5 were dried to a dry content of respectively 40% and 100% and tested according to the procedure explained in Example 6. The decreases in the oxygen concentration in the steel cylinder are shown in FIG. 1, where curve (c) corresponds to the sample with a dry content of 40%, and curve (d) to the sample with a dry content of 100%.

EXAMPLE 9

Cellulose fibres were irradiated under a nitrogen atmosphere using an Electrocurtan electron accelerator to a total dose of 150 kGy. The irradiated fibres were immediately immersed in an aqueous acrylic acid solution, which had been purged with nitrogen in advance for at least 30 minutes. The reaction was allowed to continue to completion, whereafter the fibres were washed repeatedly with water.

EXAMPLE 10

Viscose fibres were irradiated under a nitrogen atmosphere using an Electrocurtan electron accelerator to a total dose of 150 kGy. The irradiated fibres were immediately immersed in an aqueous acrylic acid solution, which had been purged with nitrogen in advance for at least 30 minutes. The reaction was allowed to continue to completion, whereafter the fibres were washed repeatedly with water.

EXAMPLE 11

A fibrous cellulose based catalyst containing 2 wt-% palladium was prepared as follows: 5 grams of grafted fibres prepared as in example 9 were dispersed in water containing 0.075 g NaOH under stirring. 0.167 g of $PdCl_2$ and 0.110 g of NaCl was dissolved in water and added to the stirred dispersion. The stirring was continued for an additional 30 minutes. The catalyst was reduced using formaldehyde. The fibres and distilled water were stirred in a beaker and the pH of the solution was adjusted to 2 by adding 1M HNO3 solution. The fibres were filtered off and treated with a sodium hydroxide solution to pH 10, thereby converting the acrylic acid grafts to the sodium salt.

EXAMPLE 12

A fibrous viscose based catalyst containing 4 wt-% palladium was prepared as follows: 10 grams of grafted fibres prepared as in example 11 were dispersed in water under stirring and 0.3 g sodium hydroxide dissolved in water was added. 0.68 g of $PdCl_2$ and 0.448 g NaCl was dissolved in water and added to the stirred dispersion. The stirring was continued for an additional 30 minutes. The pH was adjusted to 7 using sodium hydroxide solution and finally the catalysts were reduced using formaldehyde and washed with a solution of $HNO_3$ to pH 2. The fibres were filtered off and treated with a sodium hydroxide solution to pH 10, thereby converting the acrylic acid grafts to the sodium salt.

EXAMPLE 13

Fibrous catalysts prepared according to Example 11 were processed further to form a non-woven cloth using wet laid techniques, yielding a surface weight of the cloth of approximately 0.04 $g/cm^2$.

The cloth was dried and the test procedure explained in detail in Example 6 was repeated for these catalyst cloths. The decrease in the oxygen concentration in the steel cylinder is shown as curve (a) in FIG. 2.

EXAMPLE 14

Fibrous catalysts prepared according to Example 12 were processed further to form a non-woven cloth using wet laid techniques, yielding a surface weight of the cloth of approximately 0.04 $g/cm^2$.

The cloth was dried and the test procedure explained in detail in Example 6 was repeated for these catalyst cloths. The decrease in the oxygen concentration in the steel cylinder is shown as curve (b) in FIG. 2.

EXAMPLE 15

A fibrous catalyst containing 0.1 wt-% palladium was prepared as follows: 5 g of grafted fibres prepared as in Example 1 were dispersed in water with stirring. 0.013 g of Pd was dissolved in $HNO_3$ and added to the stirred dispersion. The stirring was continued for an additional 0.5 hours. The pH was adjusted to 7 using sodium hydroxide solution and finally the catalyst was reduced using formaldehyde. The fibres and distilled water were stirred in a beaker and the pH of the solution was adjusted to 1.5 by a 1 M $HNO_3$ solution. The fibres were filtered off and treated with a sodium hydroxide solution to pH 10, thereby converting the acrylic acid grafts to the sodium salt.

EXAMPLE 16

2.5 g of fibrous catalyst prepared according to Example 15 was stirred in a 5 wt-% methylene blue solution for 15 minutes. The fibres rapidly picked up the blue colour and were filtered off the solution and washed repeatedly with distilled water. The fibres were processed further to form a non-woven cloth with a surface weight of approximately 0.04 $g/cm^2$.

EXAMPLE 17

A 3 mg piece of the cloth prepared according to Example 16 was placed in a 250 ml glass vessel equipped with a venting valve, which was evacuated with a vacuum pump and then filled with $H_2$. The cloth rapidly changed colour from blue to white. After 10 minutes, the venting valve was opened and oxygen was allowed to enter the vessel. The cloth changed its colour from white to blue.

EXAMPLE 18

Non-woven cloths prepared according to Examples 5 and 16 were combined together with a self-adhesive backing layer, and tested for oxygen scavenging properties in accordance with the testing procedure explained in detail in Example 6. The oxygen concentration in the steel cylinder decreased in line with FIG. 1, and within 60 minutes the indicator had changed colour from blue to white.

What is claimed is:

1. A container or package or a label for inclusion in a container or package comprising a fibrous catalyst and a chemical indicator; wherein the fibrous catalyst comprises at least one transition metal anchored to a polymer fibre; wherein the polymer fibre comprises a plurality of grafted units grafted to a polymer backbone; and wherein the grafted units comprise a salt of a carboxylic acid.

2. A container or package or a label for inclusion in a container or package according to claim 1, wherein the polymer backbone is selected from the group consisting of polyolefins, fluorinated polyethylene, cellulose and viscose.

3. A container or package or a label for including in a container or package according to claim 1, wherein the carboxylic acid is selected from the group consisting of acrylic acid, methacrylic acid, vinyl benzoic acid and corresponding polyacids.

4. A container or package or a label for inclusion in a container or package according to claim 1, wherein at least one transition metal is chosen from palladium, platinum and ruthenium.

5. A container or package or a label for inclusion in a container or package according to claim 1, wherein the catalyst comprises a plurality of polymer fibres formed into a thread, a rope, a tow or a woven or non-woven fabric.

6. A container or a label for inclusion in a container or package according to claim 1, wherein the chemical indicator is carried on the fibrous catalyst.

7. A container or package or a label for inclusion in a container or package according to claim 1, wherein the grafted units comprise an alkali metal salt of a carboxylic acid.

8. A container or package or a label for inclusion in a container or package according to claim 7, wherein the grafted units comprise a sodium salt of a carboxylic acid.

9. A container or package or a label for inclusion in a container or package according to claim 1, wherein the chemical indicator is an indicator for the presence or absence of oxygen.

10. A container or package or a label for inclusion in a container or package according to claim 9, wherein the chemical indicator is methylene blue.

11. A method for reacting hydrogen and oxygen in a sealed package or container comprising the step of contacting hydrogen and oxygen in the presence of a catalyst, wherein the catalyst comprises at least one transition metal anchored to a polymer fibre; wherein the polymer fibre comprises a plurality of grafted units grafted to a polymer backbone; and wherein the grafted units comprise a salt of a carboxylic acid.

12. A method according to claim 11 further comprising the step of providing a chemical indicator; wherein the chemical indicator is an indicator for the presence or absence of oxygen and the catalyst and chemical indicator are disposed within a package or container.

13. A method of scavenging residual oxygen from a sealed package or container, the method comprising flushing the package or container with an inert gas containing hydrogen; and providing a fibrous catalyst such that the hydrogen reacts with the residual oxygen; wherein the catalyst comprises at least one transition metal anchored to a polymer fibre; wherein the polymer fibre comprises a plurality of grafted units grafted to a polymer backbone; and wherein the grafted units comprise a salt of a carboxylic acid.

14. A method according to claim 13, wherein the polymer backbone is selected from the group consisting of polyolefins, fluorinated polyethylene, cellulose and viscose.

15. A method according to claim 13 further comprising the step of providing a chemical indicator; wherein the chemical indicator is an indicator for the presence or absence of oxygen within the sealed package or container.

* * * * *